United States Patent [19]

Rogier et al.

[11] 3,937,687

[45] Feb. 10, 1976

[54] AMIDIFICATION PRODUCTS OF $C_{19}$ DICARBOXYLIC ACID AND CYCLICAL DIAMINES

[75] Inventors: Edgar R. Rogier, Hopkins; Allan H. Jevne, Anoka; Gerald L. Schwebke, Minneapolis, all of Minn.

[73] Assignee: General Mills Chemicals, Inc., Minneapolis, Minn.

[22] Filed: May 28, 1974

[21] Appl. No.: 473,968

[52] U.S. Cl. .......... 260/78 R; 260/18 N; 260/33.4 P
[51] Int. Cl.² ........................................... C08G 69/26
[58] Field of Search .................. 260/78 R, 18 N

[56] References Cited

UNITED STATES PATENTS

| | | | |
|---|---|---|---|
| 3,352,831 | 11/1967 | Schmitt et al. | 260/78 R |
| 3,475,387 | 10/1969 | Carter et al. | 260/78 R |
| 3,598,789 | 8/1971 | Tippetts | 260/78 R |

*Primary Examiner*—Harold D. Anderson
*Attorney, Agent, or Firm*—Anthony A. Juettner; Patrick J. Span; Elizabeth Tweedy

[57] ABSTRACT

Polyamids of a $C_{19}$ diacid and certain cyclical diamine which are excellent engineering plastics.

2 Claims, No Drawings

AMIDIFICATION PRODUCTS OF $C_{19}$ DICARBOXYLIC ACID AND CYCLICAL DIAMINES

This invention relates to high molecular weight, water insensitive, engineering plastics. More particularly, this invention relates to polyamides which are the condensation product of a selected cyclical diamine and $C_{19}$ diacid having the formula:

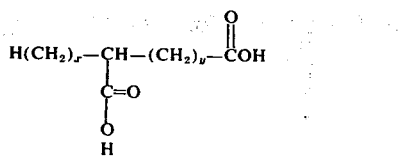

where $x$ is from 1 to 15 and $y$ from 1 to 15 and the total of $x$ and $y$ is 16. In making the polyamides of this invention, the methyl or ethyl esters of the above acids can be used as well as the acids.

The diamine useful in the present invention is:

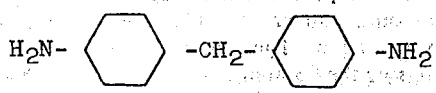

BACKGROUND OF INVENTION

Engineering plastics are those that can be molded into shapes such as gear wheels and can retain these shapes against impact and strain. In order to meet these requirements, the plastic should not crystallize but remain amorphous. The development of crystallinity in the plastic reduces its resistance to impact. As a rule of thumb, clear plastics are amorphous, while opaque plastics contain a high degree of crystallinity. In addition to remaining amorphous, the plastics must retain their tensile strength to resist breaking under strain. Many plastics which when dry display high tensile strengths lose tensile strength by absorbing small amounts of moisture from the atmosphere. Ideally, engineering plastics neither become crystalline nor sensitive to moisture.

SUMMARY OF INVENTION

It has now been found that high molecular weight polyamides, wherein the acid component is the above-identified $C_{19}$ diacid and the amine component is the above-identified diamine, are excellent engineering plastics. The polyamides are of sufficient molecular weight to product logarithmic viscosity numbers of about 30 to 150, preferably about 40 to 120, measured in orthochlorophenol solvent at a concentration of 0.005 g./ml. and at a temperature of 30°C. and determined according to ASTM Test Procedure D2857-70. They are insensitive to moisture and retain their tensile strength even though moisture is absorbed. One method of molding the polyamides involves extruding the heated polymer into a mold. The polymer is usually in the form of a ball with air space between the ball and the sides of the mold. Mechanical pressure is used to squeeze the polymer mass into the mold.

The polyamides can be prepared by conventional methods. In the final condensation product the amine component and the total acid component are present in substantially a 1:1 equivalent ratio. Satisfactory product can be obtained, however, when there is a difference in equivalents of 0 to about 10%.

DETAILED DESCRIPTION OF THE INVENTION

The heptadecane dicarboxylic acids useful in making the polyamide of this invention can be prepared by the addition of carbon monoxide and water to an unsaturated fatty acid, preferably oleic acid. Preparation is shown in Reppe and Kroper, Ann. 582, 63–65 (1953), herein incorporated by reference. The reaction involved is illustrated graphically below:

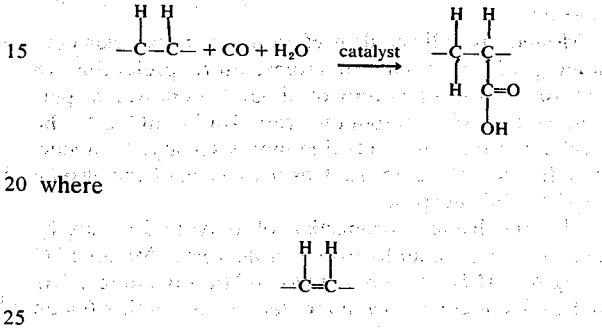

where $$-\overset{H}{\underset{}{C}}=\overset{H}{\underset{}{C}}-$$

represents the ethylene unsaturation of the fatty acid molecule.

An alternative method is to react the carbon monoxide and unsaturated fatty acid in the presence of hydrogen to get the aldehyde or alcohol or mixtures thereof which are then oxidized to the acid as shown below:

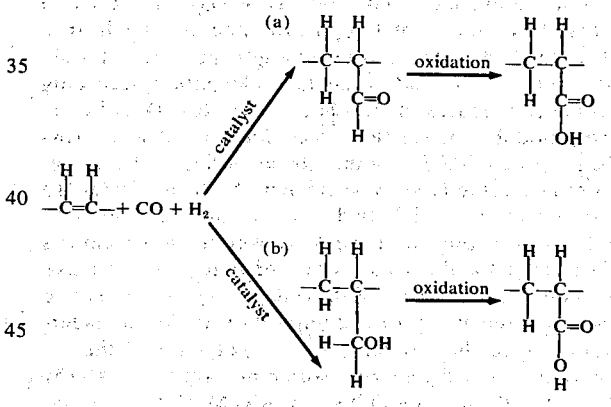

The final acid product is a mixture of isomers having one more carbon atom than the starting material. Starting with a $C_{18}$ unsaturated fatty acid such as oleic acid, the final product will be a mixture of isomers of $C_{19}$ dicarboxylic acids identified above. The product might also be regarded as a stearic acid substituted with a carboxy group along the fatty chain.

The preferred acid employed in this invention is the $C_{19}$ diacid prepared from the oxonation of oleic acid. However, other $C_{18}$ unsaturated fatty acids such as linoleic, linolenic, ricinoleic and elaidic or mixtures thereof may be employed.

The above $C_{19}$ acid, in the form of the acid, its methyl or ethyl esters, are condensed with the diamine component. The amidification reaction can be conducted by the classical melt polymerization technique, for example by heating the dicarboxylic acid and the diamine until substantially complete condensation takes place. The reaction can be completed at temperatures between about 100°C. and 300°C. The reaction is preferably conducted at temperatures between about 100°C. and 300°C. for from about 3 to 10 hours, about the last 1 to 2 hours being conducted under vacuum.

A typical heating schedule would appear as follows: Heating the mixture to a temperature of about 180° to 250°C. over a period of about 1½ to 4 hours at atmospheric pressure, followed by a period of heating of about 1 to 4 hours at about 250°C. to 270°C. at a partial vacuum of about 15 to 20 mm. Hg. which in turn is followed by a period of about 10 to 30 minutes of heating under a vacuum of about 0.2 to 10 mm. Hg.

It is preferred that the reaction be conducted in the presence of a polymerization catalyst such as triphenyl phosphite.

Monocarboxylic acids preferably the fatty acids containing 12 to 18 carbon atoms, more preferably 18 carbon atoms in amounts of about 1.5 equivalent percent of the acid component, can also be added to the acid component to control molten viscosity. Monocarboxylic aromatic acids such as benzoic acid can also be used for this purpose.

The mechanical properties of polyamides can be characterized on an Instron Tensile Tester Model TTC using ASTM D1708-66 and D638-71a procedures. The polyamide is compression molded into a 6 inch × 6 inch sheet of approximately 0.04 inch thickness, at a temperature near its melting point (usually a few degrees higher than the melting point) and at 40,000 lbs. load or higher using silicone release agent as the parting agent in the mold. From this sheet, test specimens are die cut to conform to ASTM D1708-66 and D638-71a to provide for determination of tensile strengths, percentage elongation and modulus of elasticity. Using a cross head speed of 0.5 inch/minute on the Instron Tensile Tester, the tensile strength at break, tensile strength at yield and percentage elongation according to the procedures of ASTM standard test D1708-71a. The modulus of elasticity was determined at a cross head speed of 0.05 inch/minute according to the procedure and using type IV specimen of ASTM D638-71a for specimens which had been conditioned at 50% relative humidity for 1 week, as well as on specimens desiccated for the same period of time at 0% relative humidity. Comparison of these data reveals the relative moisture sensitivity of a composition under consideration. To further characterize the polymers of this invention, the ball and ring softening point (by ASTM E28-66), flexural modulus (by ASTM D790-71) and water absorption (by ASTM D570-63) were determined.

Set out below are examples of typical preparation procedures of the polyamides of this invention and the measurements made of their physical properties.

EXAMPLE I

Amidification Product of Bis(4-aminocyclohexyl)methane

The following substances were carefully weighed into a 1.5 liter stainless steel reactor designed for pressure operation.

| Reactant | Equivalents | Grams |
|---|---|---|
| Heptadecane dicarboxylic acid* | 1.875 | 309.38 |
| Stearic Acid | 0.0218 | 6.19 |
| Bis(4-aminocyclohexyl) methane | 1.897 | 206.09 |
| Dow Corning antifoam | | 0.10 |

-continued

| Reactant | Equivalents | Grams |
|---|---|---|
| A Compound (1% in xylene) Triphenyl phosphite | | 1.00 |
| Water | | 100.00 |

*The heptadecane dicarboxylic acid was a mixture of isomers predominantly

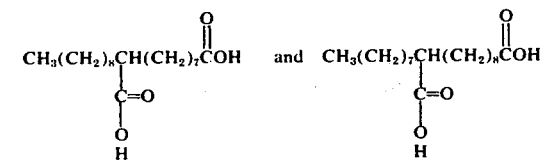

The boiling point of the mixture was 212°C. to 220°C. and the melting point was 45°C. to 55°C.

The reactor was sealed and pressurized to 100 psi. with high purity nitrogen gas; then vented to atmospheric pressure. Three such purges insured an inert atmosphere for the reaction. The reactants, in the closed vessel, were heated and stirred. At 150 psi. autogenic pressure and ca. 190°C., slow venting of H₂O vapor was begun. The temperature was raised to 250°C. during the 93 minute venting process. Aspirator vacuum (ca. 20 mm. Hg.) was applied to the stirred melt at 260°C. for 50 minutes upon completion of the venting process. Final condensation was effected with a 120 minute application of high vacuum (<1 mm. Hg.). The vacuum was released by admitting nitrogen gas and the melt was extruded from the reactor. A clear, light colored solid resulted on cooling.

The observed physical properties of the polyamide were as follows:

| Physical Properties | |
|---|---|
| Color | Clear |
| Logarithmic Viscosity Number (ml./g.) | 49.6 |
| Ball and Ring Softening Point (°C.) | 211 |
| 24 Hour water absorption (%) | 0.25 |
| Equilibrium water absorption (%) | 1.00 |
| Tensile strength at break (lbf/in²) | 5,400 |
| Tensile strength at yield (lbf/in²) | 7,100 |
| Elongation (%) | 80 |
| Modulus of Elasticity (lbf/in²) | |
| Dry | 181,000 |
| Wet | 170,000 |
| Flexural modulus (lbf/in²) | 200,000 |

The embodiments of the invention in which an exclusive property or privilege is claimed are defined as follows:

1. A polyamide consisting essentially of the amidification product of a mixture of isomers of heptadecane dicarboxylic acid having the formula:

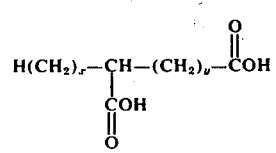

wherein $x$ is an integer from 1 to 15, $y$ is an integer from 1 to 15 and the sum of $x$ and $y$ is 16, and a cyclical diamine bis(4-aminocyclohexyl)methane, wherein the equivalents of the dicarboxylic acid and the diamine are substantially equal, wherein the amidification reaction is conducted at a temperature between about 100°C. and 300°C., and wherein the amidification product has a logarithmic viscosity number of about 30 to 150 as measured in orthochlorophenol solvent at a concentration of 0.005 g./ml. at a temperature of 30°C.

2. The polyamide of claim 1 wherein the logarithmic viscosity number is about 40 to 120.

* * * * *

UNITED STATES PATENT AND TRADEMARK OFFICE
CERTIFICATE OF CORRECTION

PATENT NO. : 3,937,687
DATED : February 10, 1976
INVENTOR(S) : Edgar R. Rogier et al It is certified that error appears in the above-identified patent and that said Letters Patent are hereby corrected as shown below:

Line 1 of the Abstract, "Polyamids" should read --Polyamides--

Column 1, line 23, delete ":"

Column 1, insert after line 23 the following which was omitted,
    --bis(4-aminocyclohexyl)methane having the formula:--

Column 2, delete incorrect formula following line 11,

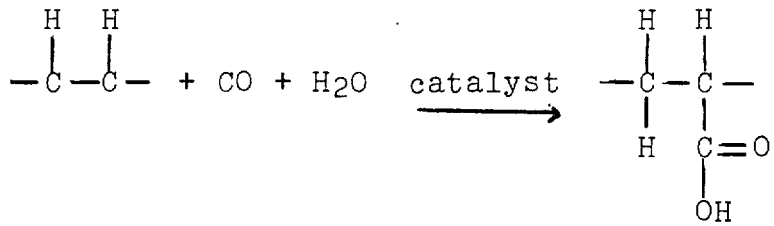

insert correct formula,

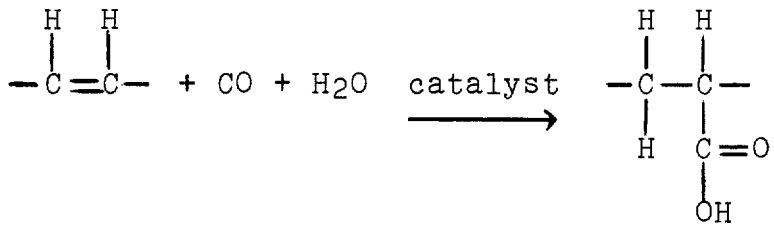

Signed and Sealed this

Third Day of August 1976

[SEAL]

Attest:

RUTH C. MASON
Attesting Officer

C. MARSHALL DANN
Commissioner of Patents and Trademarks